(No Model.) 2 Sheets—Sheet 2.
A. T. HAGEN & D. M. COOPER.
STARCHING MACHINE.
No. 554,266. Patented Feb. 11, 1896.
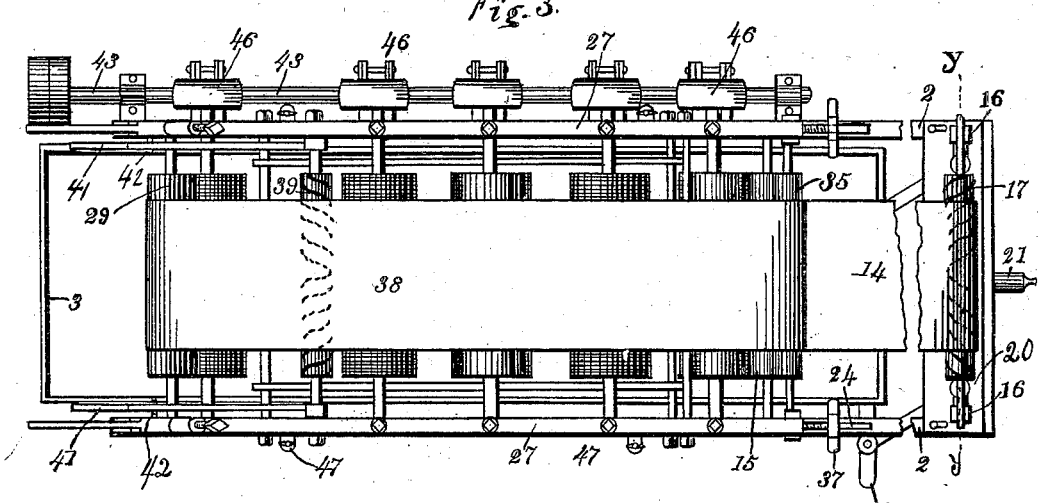
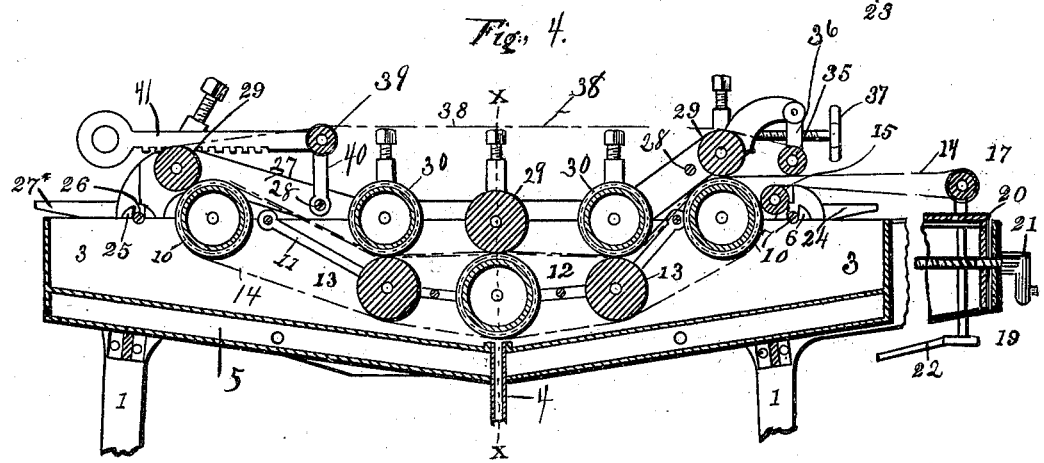
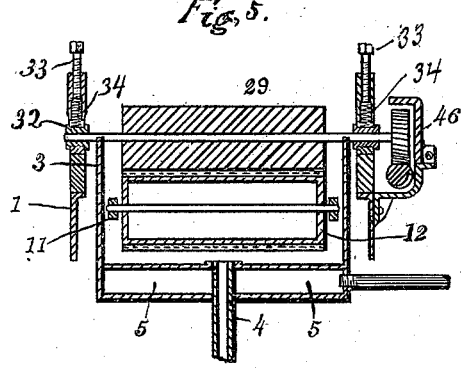
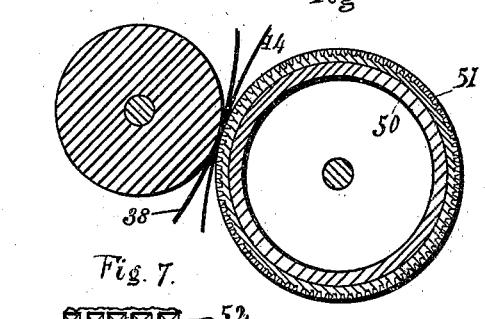

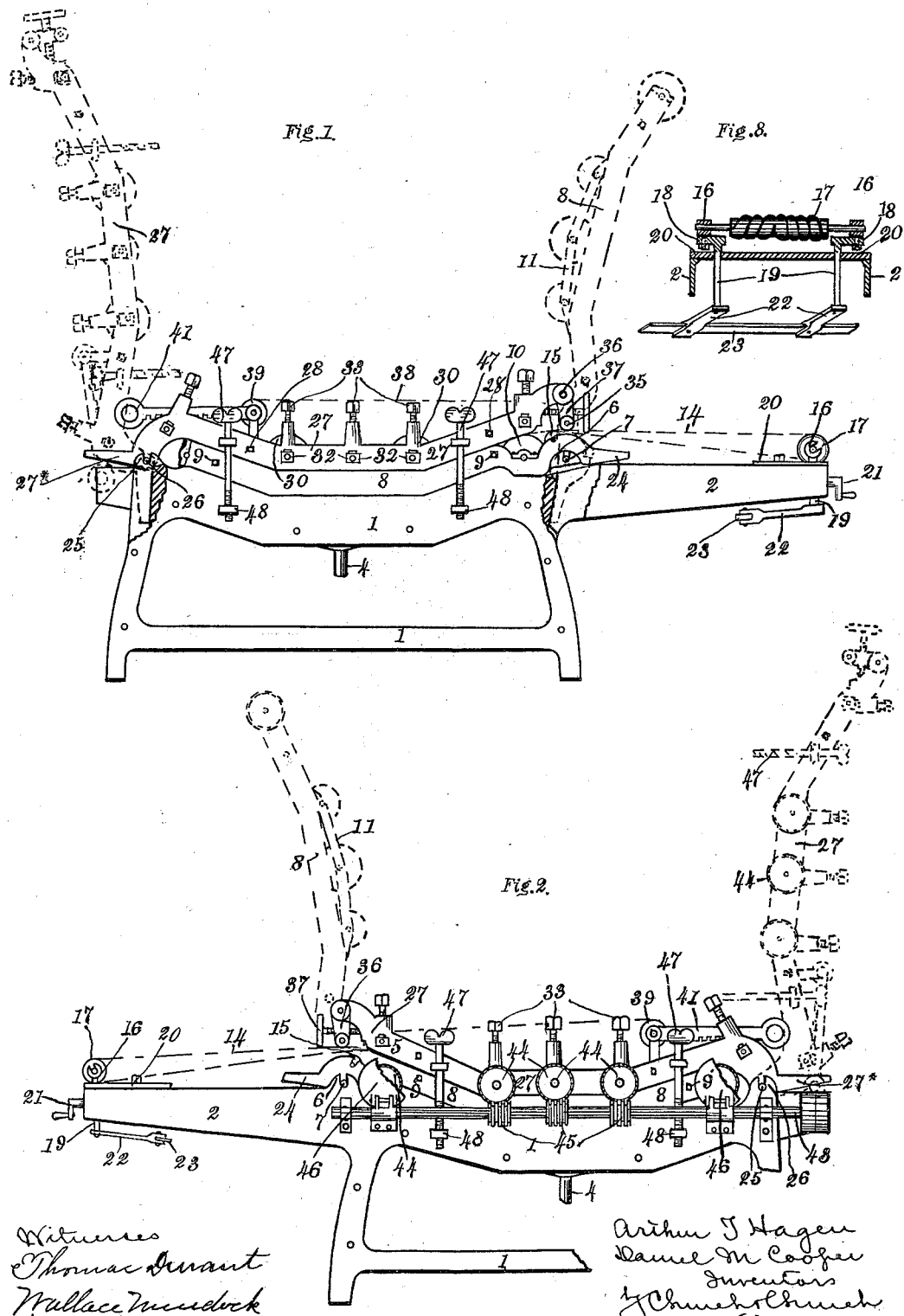

UNITED STATES PATENT OFFICE.

ARTHUR T. HAGEN AND DANIEL M. COOPER, OF ROCHESTER, NEW YORK.

STARCHING-MACHINE.

SPECIFICATION forming part of Letters Patent No. 554,266, dated February 11, 1896.

Application filed October 23, 1894. Serial No. 526,754. (No model.)

*To all whom it may concern:*

Be it known that we, ARTHUR T. HAGEN and DANIEL M. COOPER, of Rochester, in the county of Monroe and State of New York, have invented certain new and useful Improvements in Starching-Machines; and we do hereby declare the following to be a full, clear, and exact description of the same, reference being had to the accompanying drawings, forming a part of this specification, and to the reference-numerals marked thereon.

Our present invention has for its object to provide an improved starching-machine adapted particularly for rapidly and thoroughly saturating garments, more particularly collars and cuffs, with starch, and by means of which the starch is thoroughly worked into and through a garment without liability of tearing or mutilating it in any way, and it consists in certain improved construction, as will be hereinafter fully described and the novel features pointed out in the claims at the end of this specification.

In the drawings, Figure 1 is an elevation of one side of our machine; Fig. 2, a similar view of the other side; Fig. 3, a plan view; Fig. 4, a longitudinal sectional view; Fig. 5, a vertical section on the line $x\,x$ of Fig. 4; Fig. 6, a sectional view of a pair of rollers; Fig. 7, a detail of the surface of one of the rollers; Fig. 8, a sectional view on the line $y\,y$ of Fig. 3.

Similar reference-numerals indicate similar parts.

1 represents the main frame of the machine provided with suitable legs and having an extension 2 at one end, and supported within the frame is a trough or starch-receptacle 3 depressed at the center and having an exit-pipe 4 and also a steam jacket or chamber 5 in its bottom by which the starch is kept at the required temperature. At the rear of the main frame (at the right of Fig. 1) the side pieces are provided with open grooves or bearings 6, in which rest gudgeons or pins 7 formed upon or attached to a frame composed of side pieces 8, connected by suitable securing-rods 9, and which we shall call the "lower frame." Near the ends of said frame are bearings in which are arranged rollers 10 10, constructed, as presently described, with a rigid base and an elastic cellular covering or surface, and also secured to said frame is a supplemental frame 11 extending down into the starch-receptacle 3 and having journaled in it two rollers 13 provided with hard surfaces, as wood, and between them a roller 12 similar in construction to the rollers 10; also journaled near the rear end of the frame 8 is a small hard-surfaced guide-roller 15.

14 indicates a belt or apron of light and preferably loosely-woven cloth passing around the rollers just described, over the roller 15 and around a tightening-roller 17, supported in bearings 16 swiveled in cranks 18 on the upper end of rock-shafts 19, arranged in an adjustable bracket 20, said bracket being adapted to be operated back and forth by an adjusting-screw 21 engaging the main frame.

The lower ends of the shafts 19 are provided with crank-arms 22 connected by a bar 23, as shown in Fig. 8. The surface of the roller 17 is provided with spiral ribs extending from the center in opposite directions and adapted when the belt moves around said roller to smooth the belt toward the outer edges and prevent its wrinkling or creasing, and it will be seen that by means of the adjustable cross-bar 23 the roller 17 can be inclined to the plane in which the belt moves, so as to cause the belt to run at the center thereof if there should be a tendency to sidewise movement, as will be understood.

The rear ends of the side plates 8 of the lower frame are provided with extensions or arms 24 beyond the gudgeons 7, and the sides of the main frame 1 are slotted at this point, so that when desired said frame can be turned up to the position shown in dotted lines in Fig. 1 and at the left in Fig. 2, said extensions 24 having a bearing on the main frame below and toward the center, whereby said frame may be maintained in the position shown when it is desired to have access to the bottom of the starch-receptacle. At the forward end of the main frame are also provided slots 25 in which rest pins or gudgeons 26, formed upon or attached to an overlying frame, which we shall call the "upper frame," composed of side bars or plates 27, connected by suitable cross-bars 28, and journaled in said side bars are a series of rollers 29 and 30, 29 indicating hard-surface rollers arranged above the rollers 10 and 12 in the lower frame, and 30 indicating rollers having elastic cellular faces arranged above the rollers 13 in the lower frame, as shown. All of these rollers in the upper frame are mounted in adjustable spring-pressed bearing-blocks 32, suitable screws 33 passing through the sides of the frame permitting the adjustment of the tension of the springs 34, as shown in Fig. 5.

At the rear end of the upper frame is provided a roller 35 mounted in suitable bearings or arms 36, adjustable by screws 37, for giving tension to a belt 38 passing beneath all the rollers in said upper frame and also over an adjustable roller 39, having the outwardly-trending spiral ribs, as shown in Fig. 3, said roller 39 being supported upon links 40, to which are connected adjustable notched bars 41 adapted to co-operate with projections 42 at the front end of said frame, this adjustable roller 39 serving the same purpose as the roller 17 of smoothing the wrinkles out of the belt and by its adjustment causing said belt to run straight or centrally of the machine when necessary. The side bars 27 of the upper frame are extended at 27* beyond the pivots 26, so that this frame may be turned up to the position shown in dotted lines in Figs. 1 and 2 and maintained there, the preponderance of weight being outward or toward the front, and the extensions 27* preventing its tipping over, as will be understood.

The shafts of the rollers 10 in the lower frame are provided with worm-wheels 44 on their ends adapted to engage suitable worms on the main driving-shaft 43, and the rollers 30 in the upper frame and the roller 29 between them are also provided with worm-gears 44 adapted to engage worms 45, also on said driving-shaft 43. All of these worm-wheels are covered by suitable pivoted covers 46, as shown particularly in Figs. 2, 3 and 5, three of said covers being removed in Fig. 2 to show the construction. Upon the sides of the bars 27 of the upper frame are provided lugs through which pass thumb-screws 47, engaging corresponding threaded lugs 48 on the sides of the main frame for securing the parts in normal position when the machine is in operation.

The particular construction of the rollers 10, 12, and 30 is shown in Fig. 6, and said rollers consist of a suitable hard cylinder 50, preferably of metal and hollow, (in order to make it light,) and around this a cover of vulcanized rubber 51 is secured, the outer surface of said rubber covering being formed of two series of ribs extending at an angle to each other, forming cells or pockets 52, as shown particularly in Fig. 7, each adapted to contain starch, and as the goods and belts pass between these soft and hard rollers, which are arranged in pairs, the starch will be forced through the belts and garments from opposite sides alternately and they will be thoroughly impregnated.

The operation of the device will now be understood. The parts being arranged as shown in full lines, and power being applied to the shaft 43, a suitable quantity of liquid starch is placed in the chamber 3, the level thereof being maintained slightly above the tops of the bottom rollers in the lower frame. The goods are now fed in at the front of the machine between the rollers 10 and 29 and are held tightly between the belts, which carry them down between the pairs of rollers and beneath the surface of the starch, the elastic and hard-faced rolls forcing the starch into them from both sides alternately in the manner described, and the goods then passing out between the rollers are delivered at the rear end of the machine upon the belt 14, from which they may be removed by hand or suitable mechanism. The belts during their travel through the machine are kept free from wrinkles by the ribbed rollers 17 and 39, which rollers may also be adjustable at an angle to the belt in order to center it properly by the adjusting means before described, and said belts may be tightened by the set-screws 37 and 21, the latter arranged at the extreme end of the machine.

When it is desired to cleanse the machine, the starch may be drained off from the receptacle 3 by means of the pipe 4, which has a suitable cock or valve in it, and by loosening the set-screws 47 first the upper frame may be tilted toward the front of the machine, as shown in dotted lines, Fig. 1, and then the lower frame may be tilted toward the rear of the machine, as also shown in dotted lines, leaving the top of the receptacle free and unobstructed, said frames being maintained in their elevated position by their own weight, the engagement of their extensions 24 and 27* with the main frame preventing their tipping over, as will be understood.

While we prefer the arrangement of the pairs of rolls shown, we do not desire to be confined to this construction, inasmuch as, if desired, the relative position of the rolls could be reversed. It will also be understood that by means of the adjusting-screws shown the pressure between the pairs of rolls can be increased or diminished, as desired; also, the particular construction of the elastic-faced rolls may be changed without departing from the spirit of our invention.

Instead of employing the rollers in pairs consisting of one elastic cellular-faced roll and a hard-faced roll, it is obvious that all the rollers could have the elastic cellular faces, if desired; but we prefer the arrangement shown, as the starch is forced and drawn into and through the belts and garments better.

We claim as our invention—

1. In a starching-machine, the combination with a starch receptacle or trough, of two conveying belts or aprons extending through said receptacle in contact, and a pair of rollers in said receptacle between which said belts pass, one of said rollers having an elastic cellular surface, substantially as described.

2. The combination with a starch-receptacle, of two conveying belts or aprons extending through said receptacle in contact, and two pairs of rollers in said receptacle between which said belts pass, one roller of each pair having an elastic cellular surface, and the elastic-surface rollers being arranged on opposite sides of the belts, substantially as described.

3. The combination with a starch-receptacle, of a conveying belt or apron extending through said receptacle, and a pair of rollers in the receptacle between which said belt passes, one of the rollers having the elastic cellular surface, substantially as described.

4. The combination with a starch-receptacle, of two pairs of rollers therein, one roller of each pair having an elastic cellular surface and the elastic-surface rollers being arranged to operate on opposite sides of goods passing between said pairs of rollers in the starch-receptacle, substantially as described.

5. The combination with a starch-receptacle, of two conveying belts or aprons extending through said trough in contact, two pairs of rollers in the receptacle between which said belts pass, one roller of each pair having an elastic cellular surface, and the other an unyielding surface, said elastic-faced rollers being arranged on opposite sides of the belts, substantially as described.

6. The combination with the main frame and the starch-receptacle, of two independent superposed frames, each frame having two or more rollers and a continuously-moving belt or apron passing around them, said belts being arranged to run in contact, and the rollers in the frames to co-operate in pairs, substantially as described.

7. The combination with the main frame and the starch-receptacle, of the two superposed frames pivoted at opposite ends of the main frame, each frame having two or more rollers and a belt or apron passing around them, said belts being arranged to run in contact and the rollers in the frames to co-operate in pairs, and driving devices for positively driving the rollers in the upper frame, substantially as described.

8. The combination with the main frame and the starch-receptacle, of the upper frame having the positively-driven rollers, the loose rollers, the belt and belt-tightener thereon, and the lower frame having the positively-driven rollers, the loose rollers and the belt passing around them, the rollers in the upper and lower frames being arranged to co-operate in pairs consisting of one loose and one driven roller, substantially as described.

9. The combination with the main frame and the starch-receptacle, of the two independent superposed frames pivoted at opposite ends of the main frame, each of said frames having alternate hard and elastic cellular-faced rollers, and the rollers of the two frames arranged to co-operate in pairs consisting of a hard and a roller having an elastic cellular face, substantially as described.

10. The combination with the main frame, the starch-receptacle, the lower frame pivoted to the main frame at one end having the driven rollers at its ends, the intermediate loose rollers arranged in the receptacle and the belt and tightening devices therefor, of the upper frame pivoted to the main frame at one end, having the loose rollers at the ends, the intermediate driven rollers co-operating with the loose rollers in the lower frame, and the belt and tightening devices for the belt, substantially as described.

11. In a starching-machine, the combination with the main frame and the starch-receptacle, of the lower frame having the rollers and belt, the upper frame having the rollers mounted in elastic bearings, and the belt, and adjustable connections, as screws, connecting the upper frame to the main frame, substantially as described.

12. The combination with the main frame and the starch-receptacle, of the lower frame pivoted at one end to the main frame having the arms or extensions beyond the pivots, forming stops for limiting movement on the pivots, and the rollers and belt on said frame, the upper frame pivoted at the opposite end of the main frame having the arms or extensions forming stops for limiting the movement on the pivots, and the rollers and belt on said frame, substantially as described.

13. The combination with a conveying-belt, a belt-roller having reversed spiral ribs extending from the center, of bearings for said roller movable in opposite directions to incline the roller to the plane of movement of the belt, whereby the belt may be prevented from creasing and shifted laterally, substantially as described.

14. The combination with a conveying-belt, and a belt-roller having reversed spiral ribs extending from the center, of pivoted bearings for said roller connected for simultaneous operation in opposite directions in the plane of the movement of the belt, and an adjustable support for said bearings, whereby the belt may be kept free of wrinkles or creases and be tightened and shifted laterally, substantially as described.

15. The combination with a conveying-belt, of the roller having the reversed spiral ribs extending from the center, the bearings 18, the arbors 19 having the cranks on which the bearings are pivoted, and the connections between said arbors for simultaneously rocking them in opposite directions, substantially as described.

ARTHUR T. HAGEN.
DANIEL M. COOPER.

Witnesses:
EUGENE F. UNDERHILL,
J. D. F. WHITBECK.